US010937444B1

(12) United States Patent
Suendermann-Oeft et al.

(10) Patent No.: US 10,937,444 B1
(45) Date of Patent: Mar. 2, 2021

(54) END-TO-END NEURAL NETWORK BASED AUTOMATED SPEECH SCORING

(71) Applicant: Educational Testing Service, Princeton, NJ (US)

(72) Inventors: David Suendermann-Oeft, San Francisco, CA (US); Lei Chen, Lawrenceville, NJ (US); Jidong Tao, Lawrenceville, NJ (US); Shabnam Ghaffarzadegan, San Mateo, CA (US); Yao Qian, Dublin, CA (US)

(73) Assignee: Educational Testing Service, Princeton, NJ (US)

( * ) Notice: Subject to any disclaimer, the term of this patent is extended or adjusted under 35 U.S.C. 154(b) by 282 days.

(21) Appl. No.: 16/196,716

(22) Filed: Nov. 20, 2018

Related U.S. Application Data

(60) Provisional application No. 62/589,944, filed on Nov. 22, 2017.

(51) Int. Cl.
*G10L 25/30* (2013.01)
*G10L 15/16* (2006.01)
*G06F 17/18* (2006.01)
*G06N 3/04* (2006.01)
*G06F 40/284* (2020.01)
*G10L 25/60* (2013.01)

(52) U.S. Cl.
CPC .............. *G10L 25/30* (2013.01); *G06F 17/18* (2013.01); *G06F 40/284* (2020.01); *G06N 3/0454* (2013.01); *G06N 3/0481* (2013.01); *G10L 15/16* (2013.01); *G10L 25/60* (2013.01)

(58) Field of Classification Search
CPC .......... G10L 25/60; G10L 25/30; G10L 15/16
See application file for complete search history.

(56) References Cited

U.S. PATENT DOCUMENTS

| 9,263,036 B1* | 2/2016 | Graves .................... G10L 15/16 |
| 9,984,682 B1* | 5/2018 | Tao ........................ G09B 19/04 |
| 2010/0145698 A1* | 6/2010 | Chen ....................... G09B 7/02 |
| | | 704/256.1 |
| 2012/0016672 A1* | 1/2012 | Chen ........................ G10L 25/60 |
| | | 704/236 |
| 2015/0248608 A1* | 9/2015 | Higgins .................... G06N 3/08 |
| | | 706/16 |
| 2018/0330729 A1* | 11/2018 | Golipour ................. G10L 15/16 |

OTHER PUBLICATIONS

Eskenazi, Maxine; An Overview of Spoken Language Technology for Education; Speech Communication, 51; pp. 832-844; 2009.

(Continued)

*Primary Examiner* — Samuel G Neway
(74) *Attorney, Agent, or Firm* — Jones Day (57) ABSTRACT

A system for end-to-end automated scoring is disclosed. The system includes a word embedding layer for converting a plurality of ASR outputs into input tensors; a neural network lexical model encoder receiving the input tensors; a neural network acoustic model encoder implementing AM posterior probability, word duration, mean value of pitch and mean value of intensity based on a plurality of cues; and a linear regression module, for receiving concatenated encoded features from the neural network lexical model encoder and the neural network acoustic model encoder.

20 Claims, 3 Drawing Sheets

(56) References Cited

OTHER PUBLICATIONS

Zechner, Klaus, Higgings, Derrick, Xi, Xiaoming, Williamson, David; Automatic Scoring of Non-Native Spontaneous Speech in Tests of Spoken English; Speech Communication, 51(10); pp. 883-895; 2009.
Bernstein, Jared, Van Moere, Alistair, Cheng, Jian; Validating Automated Speaking Tests; Language Testing, 27(3); pp. 355-377; 2010.
Witt, Silke; Use of the Speech Recognition in Computer-Assisted Language Learning; Unpublished Dissertation, Cambridge University, Engineering Department; Cambridge, U.K.; 1999.
Hu, Wenping, Qian, Yao, Soong, Frank; A New DNN-Based High Quality Pronunciation Evaluation for Computer-Aided Language Learning (CALL); Interspeech; Lyon, France; pp. 1886-1890; Aug. 2013.
Hu, Wenping, Qian, Yao, Soong, Frank, Wang, Yong; Improved Mispronunciation Detection with Deep Neural Network Trained Acoustic Models and Transfer Learning Based Logistic Regression Classifiers; Speech Communication, 67; pp. 154-166; 2015.
Metallinou, Angeliki, Cheng, Jian; Using Deep Neural Networks to Improve Proficiency Assessment for Children English Language Learners; Interspeech; pp. 1468-1472; Sep. 2014.
Cheng, Jian, Chen, Xin, Metallinou, Angeliki; Deep Neural Network Acoustic Models for Spoken Assessment Applications; Speech Communication, 73; pp. 14-27; Oct. 2015.
Tao, Jidong, Ghaffarzadegan, Shabnam, Chen, Lei, Zechner, Klaus; Exploring Deep Learning Architecture for Automatically Grading Non-Native Spontaneous Speech; Proceedings of IEEE ICASSP; pp. 6140-6144; 2016.
LeCun, Yann, Kavukcuoglu, Koray, Farabet, Clement; Convolutional Networks and Applications in Vision; Proceedings of the 2010 IEEE International Symposium on Circuits and Systems (ISCAS); 2010.
Alikaniotis, Dimitrios, Yannakoudakis, Helen, Rei, Marek; Automatic Text Scoring Using Neural Networks; Proceedings of the 54th Annual Meeting of the Association for Computational Linguistics; Berlin, Germany; pp. 715-725; Aug. 2016.
Hochreiter, Sepp, Schmidhuber, Jurgen; Long Short-Term Memory; Neural Computation, 9(8); pp. 1735-1780; 1997.
Taghipour, Kaveh, Ng, Hwee Tou; A Neural Approach to Automated Essay Scoring; Proceedings of the 2016 Conference on Empirical Methods in Natural Language Processing; Austin, Texas; pp. 1882-1891; Nov. 2016.
Yu, Zhou, Ramanarayanan, Vikram, Suendermann-Oeft, David, Wang, Xinhao, Zechner, Klaus, Chen, Lei, Tao, Jidong, Ivanou, Aliaksei, Qian, Yao; Using Bidirectional LSTM Recurrent Neural Networks to Learn High-Level Abstractions of Sequential Features for Automated Scoring of Non-Native Spontaneous Speech; IEEE Workshop on Automatic Speech Recognition and Understanding (ASRU); pp. 2~338-345; Dec. 2015.
Kim, Yoon; Convolutional Neural Networks for Sentence Classification; Proceedings of the 2014 Conference on Empirical Methods in Natural Language Processing (EMNLP); Doha, Qatar; pp. 1746-1751; Oct. 2014.
Graves, Alex, Fernandez, Santiago, Schmidhuber, Jurgen; Bidirectional LSTM Networks for Improved Phoneme Classification and Recognition; International Conference on Artificial Neural Networks; pp. 799-804; 2005.
Luong, Minh-Thang, Pham, Hieu, Manning, Christopher; Effective Approaches to Attention-Based Neural Machine Translation; Proceedings of the 2015 Conference on Empirical Methods in Natural Language Processing; Lisbon, Portugal; pp. 1412-1421; Sep. 2015.
Raffel, Colin, Ellis, Daniel; Feed-Forward Networks with Attention Can Solve Some Long-Term Memory Problems; ICLR Workshop; 2016.
Chen, Lei, Yoon, Su-Youn; Application of Structural Events Detected on ASR Outputs for Automated Speaking Assessment; Interspeech; 2012.
Chen, Lei, Zechner, Klaus; Applying Rhythm Features to Automatically Assess Non-Native Speech; Interspeech; pp. 1861-1864; 2011.
Chen, Lei, Zechner, Klaus, Xi, Xiaoming; Improved Pronunciation Features for Construct-Driven Assessment of Non-Native Spontaneous Speech; Human Language Technologies: The 2009 Annual Conference of the North American Chapter of the ACL; pp. 442-449; Jun. 2009.
Pennington, Jeffrey, Socher, Richard, Manning, Christopher; GloVe: Global Vectors for Word Representation; Proceedings of the Conference on Empirical Methods in Natural Language Processing; 2014.
Kingma, Diederik, Ba, Jimmy Lei; ADAM: A Method for Stochastic Optimization; ICLR; 2015.
Bergstra, J., Yamins, D., Cox, David; Making a Science of Model Search: Hyperparameter Optimization in Hundreds of Dimensions for Vision Architectures; Proceedings of the 30th International Conference on Machine Learning; Atlanta, Georgia; pp. 115-123; 2013.

\* cited by examiner

END-TO-END NEURAL NETWORK BASED AUTOMATED SPEECH SCORING

CROSS-REFERENCE TO RELATED APPLICATIONS

This application claims priority to U.S. Provisional Application No. 62/589,944, filed Nov. 22, 2017, entitled "End-To-End Neural Network Based Automated Speech Scoring," which is incorporated herein by reference in its entirety.

BACKGROUND

In the last two decades, there are large number of studies using automatic speech recognition (ASR) technology to support language learning, such as computer aided pronunciation training (CAPT) and automated speech scoring. In an automated speech scoring system, different handcrafted speech features were computed using various methods including signal processing, prosodic analysis, and natural language processing (NLP). The extracted features were fed into a statistical model to predict the scores reflecting speaking proficiency levels.

Speech scoring is the task of measuring speech proficiency based on a set of predefined features suggested in English Language Learner (ELL) studies, including speaking fluency, intonation, vocabulary, etc. Most of the previous work on measuring speech proficiency used ASR outputs and prosodic analyses to calculate the score. Specifically, measuring pronunciation performance, Goodness of Pronunciation (GOP) features based on posterior probabilities from an acoustic model (AM) is a predominant approach for speech assessment. SpeechRater™ for the Educational Testing Service® (ETS) TOEFL® test is a working example of this method using a rich set of hand crafted speech features.

In recent years, fast growing deep learning (DL) technology has also been applied on the speech scoring task. Beyond providing more accurate recognition outputs, acoustic models using deep neural network (DNN) structures have been largely used to improve pronunciation measurements. For example, a deep belief network (DBN) model is used as AMs and found that DBN AMs improved pronunciation evaluation performance over their GMM counterparts. In another example, context-dependent DNN hidden Markov models (CD-DNN-HMM) is used to improve ASR, and more accurate automatic assessment of child English learners is achieved. In other examples, three types of DL based AM structures, i.e., DNN, Convolution Neural Network (CNN), and a Tandem GMM-HMM model with bottleneck features are used. These deep learning based AMs were found to provide substantial increase of recognition accuracies and improved scoring performance compared to GMM AMs.

In addition, there were several successful applications of deep learning based automated scoring models on written responses. For example, an end-to-end NN based model is used to automatically score essays. The model contains a special word embedding training part that considered essays' scores to be additional constrains and a bi-directional Recurrent Neural Network (RNN) for learning features. On the Automated Student Assessment Prize (ASAP) essay data set, this NN scoring model showed better performance than the conventional model using hand crafted features, e.g., word and part-of-speech (POS) n-grams, phrase-structure, etc. On the same ASAP essay data set, a hybrid NN model that consisted of a CNN model is used to encode local context information and an RNN to encode long-range information. Instead of using RNN model's hidden vector on the last time stamp, a mean over time (MOT) aggregation was used to utilize information over entire essays. The proposed NN model showed improved performance compared to a publicly available open-source conventional model, Enhanced AI Scorer (EASE). On spoken responses, a preliminary trial of the end-to-end scoring was made. Using prosodic and spectrum measurements, a bi-directional RNN was used to learn features. However, the learned features were tested together with the hand crafted features.

BRIEF DESCRIPTION OF THE FIGURES AND TABLES

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2A is a diagram illustrating one-dimensional (1D) Convolutional Neural Networks (CNN), FIG. 2B is a diagram illustrating Bi-Directional Recurrent Neural Network (RNN) using Long Short Time Memory (LSTM) cells (BD-LSTM), FIG. 2C is a diagram illustrating BD-LSTM RNN with an attention weighting scheme, according to some embodiments.

Table 1 is descriptions of SpeechRater™ features for automated speech scoring, according to some embodiments.

Table 2 is a comparison of the Pearson correlations between human rated scores and the machine predicted scores from conventional model and the NN models using different encoders, according to some embodiments.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s)

as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

According to some embodiments, an end-to-end scoring solution for automated speech scoring task is implemented using both lexical cues in recognized words and acoustical cues to rate open-ended spoken responses. According to some embodiments, hand crafted features is not an ideal choice due to the difficulties in finding the right features for the task and the development efforts. According to some embodiments, many machine learning tasks deploy end-to-end methods which entail automatically learning features and using a coherent process to jointly obtain representation and models.

Figure 1:
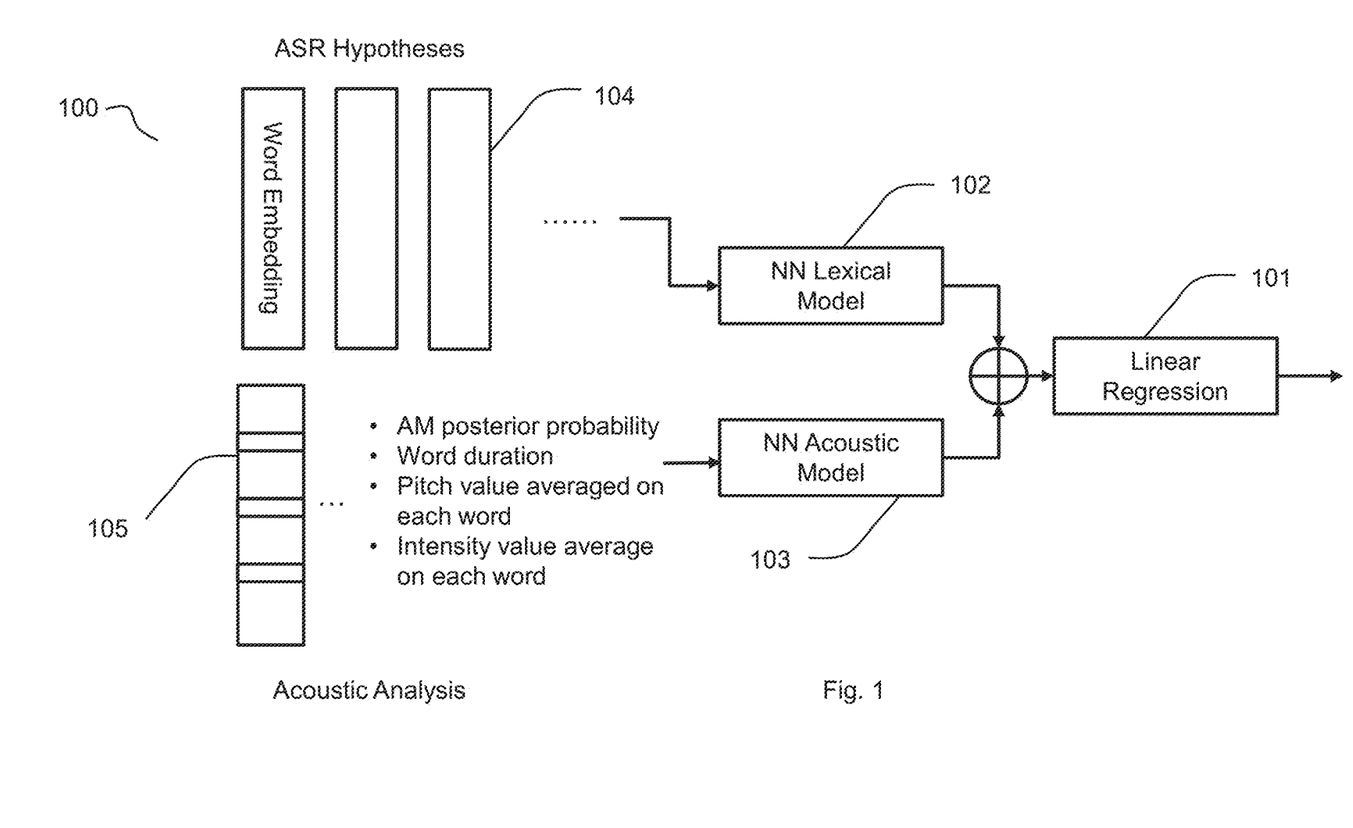
FIG. 1 is a diagram illustrating an end-to-end automated scoring solutions using two NN encoders for feature learning, according to some embodiments.

According to some embodiments, an end-to-end solution consists of using deep neural network models to encode both lexical and acoustical cues to learn predictive features automatically instead of hand crafted features. According to some embodiments, FIG. 1 illustrates the end-to-end automated speech scoring solution of the present disclosure. Two Deep learning (DL)-based models are used to encode both lexical and acoustic cues. The encoded features are concatenated and fed into a linear regression model (layer) to predict the scores. To build the lexical model, the ASR outputs are converted into input tensors using a word embedding layer. For the acoustic model, four measurements for each word are used: (1) Acoustic Model (AM) posterior probability, (2) word duration, (3) mean value of pitch, and (4) mean value of intensity. The deep learning structures used to model the learned word representation for lexical and acoustical cues can include: 1D Convolutional Neural Networks (CNN), Bi-Directional Recurrent Neural Network (RNN) using Long Short Time Memory (LSTM) cells (BD-LSTM), and the BD-LSTM RNN with an attention weighting scheme.

According to some embodiments, the end-to-end solutions have shown advantages in achieving more efficient model-building processes and improved prediction performances. According to some embodiments, such solutions suggest a promising direction for the automated speech scoring field.

FIG. 1 is a diagram illustrating an end-to-end automated scoring solutions using two NN encoders for feature learning, according to some embodiments. Two deep learning based encoders 102 and 103 are used to encode both lexical and acoustic cues. According to some embodiments, encoder 102 is a neural network lexical model encoder and encoder 103 is a neural network acoustic model encoder. According to some embodiments, the encoded features are concatenated and fed into a linear regression model (layer) to predict the scores. To build the lexical model encoder 102, the ASR outputs are converted into input tensors using a word embedding layer. According to some embodiments, the ASR hypothesis 104 is a plurality of word embedding's. For acoustic analysis module 105, four measurements for each word are implemented: (1) AM posterior probability, (2) word duration, (3) mean value of pitch, and (4) mean value of intensity. According to some embodiments, these four acoustic analysis are fed into the NN acoustic model 103. According to some embodiments, these measurement are chosen based on the widely used cues which will be explained in more details below. According to some embodiments, three different deep learning structure are implemented to model the learned word representation for lexical and acoustical cues. According to some embodiments, the deep learning structures include: 1D Convolutional Neural Networks, Bi-Directional RNN using Long Short Time Memory (LSTM) cells (BD-LSTM), and the BD-LSTM RNN with an attention weighting scheme.

Figure 2:
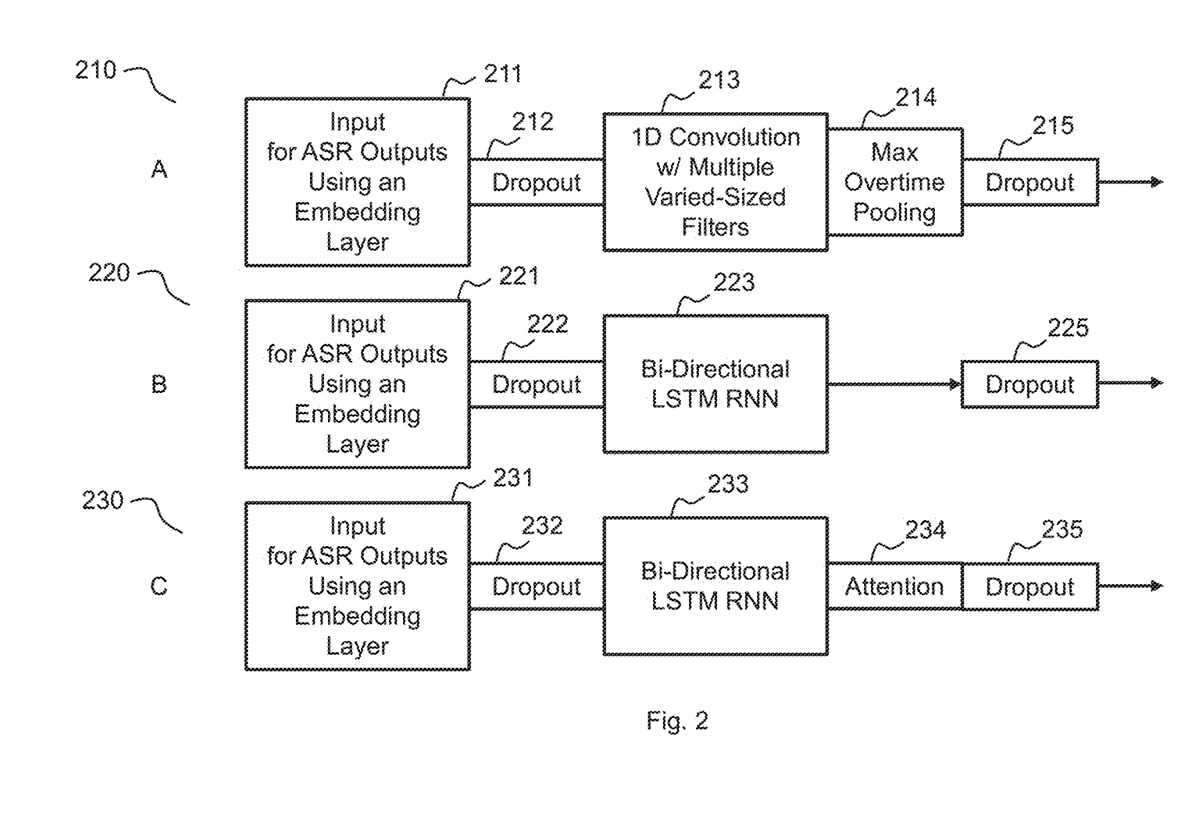
FIG. 2 are diagrams illustrating three types of NN models for encoding input cues to learn useful features.

FIG. 2 is a diagram illustrating three types of NN models for encoding input cues to learn useful features; FIG. 2A is a diagram illustrating 1D Convolutional Neural Networks (CNN); FIG. 2B is a diagram illustrating Bi-Directional Recurrent Neural Network (RNN) using Long Short Time Memory (LSTM) cells (BD-LSTM); FIG. 2C is a diagram illustrating BD-LSTM RNN with an attention weighting scheme, according to some embodiments.

FIG. 2A is a diagram illustrating 1D Convolutional Neural Networks (CNN), according to some embodiments. In FIG. 2A, input for ASR output using an embedding layer is received at layer 211, a dropout layer 212 with the probability $dp_{CNN}1$ is applied before 1D convolution with multiple varied-sized filters at layer 213 for generalization purposes. According to some embodiments, dropout is a technique to improve over-fit on neural networks. According to some embodiments, convolution filters with varied sizes ($conv_{size}-1$, $conv_{size}$, and $conv_{size}+1$) in layer 213 are implemented to cover different receiving fields. According to some embodiments, for each size n, $conv_n$ filters are implemented. For each filter output, a max-overtime pooling layer 214 is implemented which produces $3 \times conv_n$ dimensional encoded vector. This vector is run through second dropout layer 215 with the probability ($dp_{CNN}2$).

FIG. 2B is a diagram illustrating Bi-Directional Recurrent Neural Network (RNN) using Long Short Time Memory (LSTM) cells (BD-LSTM), according to some embodiments. FIG. 2B shows the BD RNN with LSTM cells, according to some embodiments. FIG. 2B is similar to FIG. 2A, the difference is that, after the first dropout layer 222, data is applied to a bidirectional LSTM RNN layer 223, and then directly applied to the second dropout layer 225. Bi-directional network 223 is selected to take into account information both from past and future given the inherent nature of speech and language production. The final vector of each hidden state at time t is formed by concatenating the hidden state vectors from two directions with $LSTM_{dim}^{cue}$ dimensions. According to some embodiments, cue can refer to either lexical (lex) or acoustical (ac) information. According to some embodiments, two dropout layers are applied before and after the BD RNN layer with the probability values of $dp_{RNN}1$ and $dp_{RNN}2$.

FIG. 2C is a diagram illustrating BD-LSTM RNN with an attention weighting scheme, according to some embodiments. FIG. 2C is similar to FIG. 2B, the difference is that, after the bidirectional LSTM RNN layer 233, data is applied to an attention model 234, and then the output from the attention layer is applied to the second dropout layer 235. According to some embodiments, the entire CNN encoder's output was fed into a linear regression model to predict speech score.

According to some embodiments, the attention mechanism to the BD-LSTM model is proven very effective in many natural language processing tasks. FIG. 2C illustrates that an attention model 234 is added to the system of the present disclosure through one more layer. In the BD-LSTM model, only the last hidden state ($h_T$) is implemented to make the final decision and the context information from previous times (prior to T) were not utilized. To overcome this limitation, a simple feedforward attention model is implemented to obtain a set of weights for all hidden states. A single vector S from an entire sequence ($h_t$) can be formulated as follows:

$$e_t = a(h_t), \alpha_t = \frac{\exp(e_t)}{\sum_{k=1}^{T} \exp(e_k)}, S = \sum_{t=1}^{T} \alpha_t h_t$$

where, a is a learnable function depending on $h_t$. Such simplified feed-forward attention can be seen as producing a fixed-length embedding S of the input sequence by computing an adaptive weighted average of the hidden state sequence h.

Figure 3:
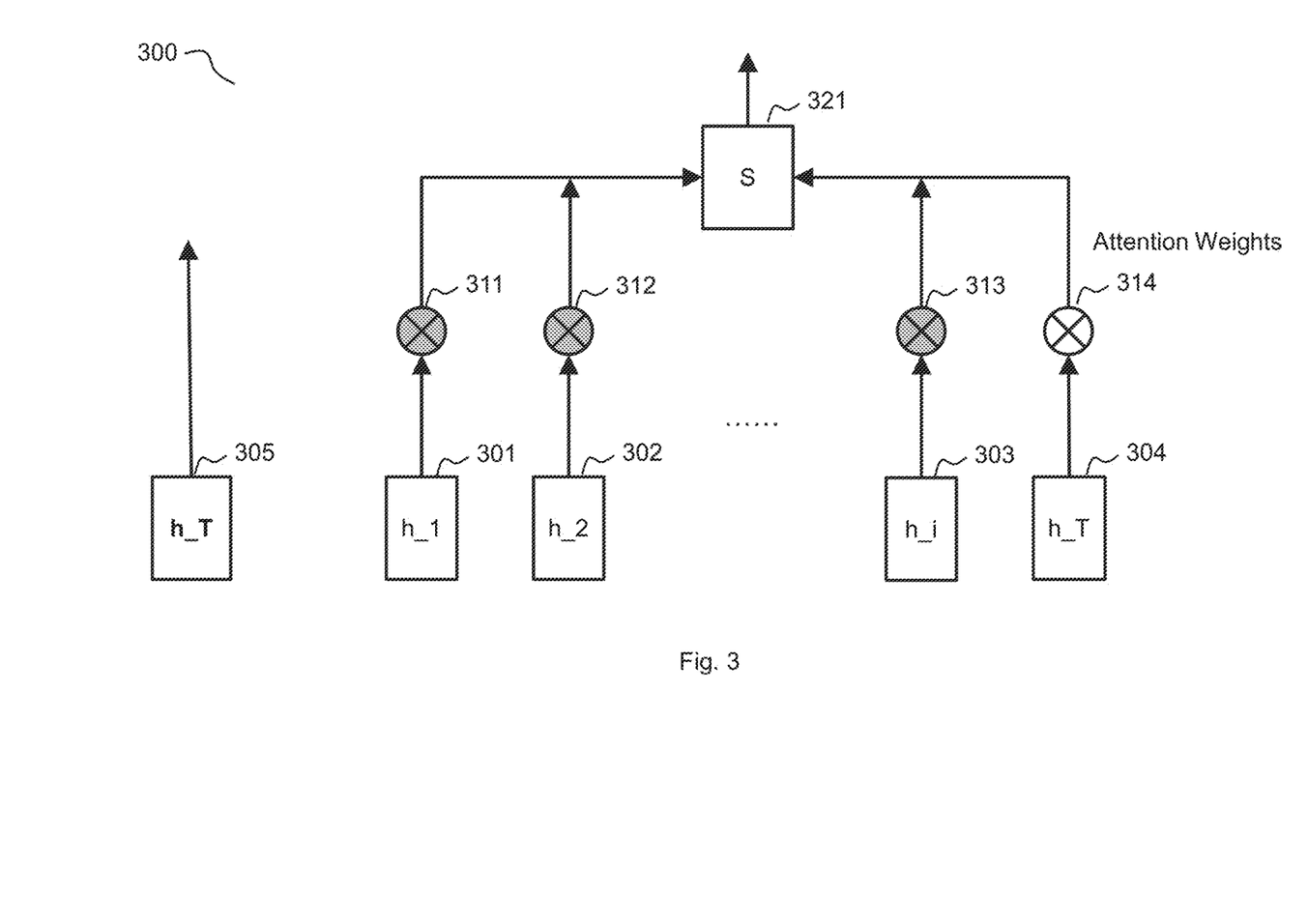
FIG. 3 is a diagram illustrating implementation of BD-LSTM's last hidden state vs. using a feed forward attention mechanism to utilize a weighted average of all hidden states, according to some embodiments.

FIG. 3 is a diagram illustrating implementation of BD-LSTM's last hidden state vs. using a feed forward attention mechanism to utilize a weighted average of all hidden states, according to some embodiments.

According to some embodiments, an RNN model processes a sequence of input data by recursively applying a transitional function to its hidden state vector $h_t$. The activation of $h_t$ at time-step t depends on both the current input $x_t$ and the previous hidden state $h_{t-1}$.

$$h_t = f(h_{t-1}, x_t).$$

According to some embodiments, an RNN model 321 encodes an input sequence to a fixed-sized vector 305 $h_T$ on its last time step T and uses it as the input for following prediction steps. According to some embodiments, scalars $h_1$ (301), $h_2$ (302), ..., $h_1$ (303) and $h_T$ (304) are the individual components of the vector $h_T$ with corresponding weights 311, 312, 313 and 314. According to some embodiments, the implementation of an RNN alone can be hampered by exploding or vanishing gradients problem, which is the fact that gradients may grow or decay exponentially during RNN training. According to some embodiments, LSTM cell addresses this issue, and makes RNNs useful in practice. As a result, LSTM structure is implemented in the present disclosure.

According to some embodiments, LSTM units at each time step t can be defined by a collection of vectors in $R^d$: an input gate $i_t$, a forget gate $f_t$, an output gate $o_t$, a memory cell $c_t$ and a hidden state $h_t$. According to some embodiments, at each time step, an LSTM maintains a hidden vector h and a memory vector c, responsible for controlling state updates and outputs. According to some embodiments, the computation at time step t is defined as follows:

$$i_t = \sigma(W_i x_t + U_i h_{t-1} + V_i c_{t-1})$$

$$f_t = \sigma(W_f x_t + U_f h_{t-1} + V_f c_{t-1})$$

$$o_t = \sigma(W_o x_t + U_o h_{t-1} + V_o c_t)$$

$$c_t = f_t \odot c_{t-1} + i_t \odot \tanh(W_c x_t + U_c h_{t-1})$$

$$h_t = o_t \odot \tanh(c_t)$$

where $x_t$ is the input (word embedding vector) at the current time step t, σ is the logistic sigmoid function and denotes elementwise multiplication. The forget gate $f_t$ controls how much of the information stored in the memory cell will be erased, the input gate it controls how much each unit is updated, and the output gate $o_t$ controls the exposure of the internal memory cell.

According to some embodiments, the data collected from an online practice for a well-known English test that measures test takers' readiness to attend schools with English as primary instructional language is utilized. The dataset is divided into three partitions, train set containing 2930 spoken responses, dev set containing 731 responses, and eval set containing 1827 responses. All spoken responses were scored by experienced human raters following the 4-point scale scoring rubric designed for scoring this English test. The score 1 was the lowest band while the score 4 was the highest band. Each response was scored by one group of raters (R1) and verified by the second group of raters (R2). Note that in the experiments of the present disclosure, only the scores provided by the R1 group were used to be ground truth scores.

According to some embodiments, the ASR system used for recognizing test takers' non-native English responses is a DNN-HMM hybrid ASR system built with Kaldi open-source toolkit. This model is a 5-layer feed-forward DNN using acoustic features from current frame plus previous and following 5 context frames. The ASR model is trained on the transcribed responses from the practice English test containing 819 hours of non-native spontaneous speech covering more than 100 first languages from about 150 countries around the world. According to some embodiments, this ASR system achieved a word error rate around 35% on the spoken responses collected in the online practice test.

SpeechRater™ is an automated scoring engine for assessing nonnative English proficiency and is used to extract scoring features. The features are related to several aspects of the speaking construct, which include fluency, rhythm, intonation & stress, pronunciation, grammar, and vocabulary use. In psychometric terms, a construct is a set of knowledge, skills, and abilities that are required in a given domain. Table 1 provides a concise synopsis of these features.

TABLE 1

| Category | Example Features |
|---|---|
| Fluency | Features based on the number of words per second, number of words per chunk, number of silences, average duration of silences, frequency of long pauses (≥0.5 sec.), number of filled pauses (uh and um) [2]. Frequency of between-clause silences and edit disfluencies compared to within-clause silences and edit disfluencies [19]. |
| Rhythm, Intonation & Stress | Features based on the distribution of prosodic events (prominences and boundary tones) in an utterance as detected by a statistical classifier (overall percentages of prosodic events, mean distance between events, mean deviation of distance between events) [2] as well as features based on the distribution of vowel, consonant, and syllable duration (overall percentages, standard deviation, and Pairwise Variability Index) [20]. |
| Pronunciation | Acoustic model likelihood scores, generated during forced alignment with a native speaker acoustic model, the average word-level confidence score of ASR and the average difference between the vowel durations in the utterance and vowel-specific means based on a corpus of native speech [21] |
| Grammar | Similarity scores of the grammar of the response in ASR with respect to reference response. |
| Vocabulary Use | Features about how diverse and sophisticated the vocabulary based on the ASR output. |

In Table 1, for the first feature "fluency", examples include features based on the number of words per second, number of words per chunk, number of silences, average duration of silence, frequency of long pauses (>=0.5 sec), number of filled pauses (uh and um), frequency of between clause silences and edit disfluencies compared to within-clause silences and edit disfluencies. For the second feature "rhythm, intonation and stress", examples include features based on the distribution of prosodic events (prominences and boundary tones) in utterance as detected by a statistical classifier (overall percentages of prosodic events, mean distance between events, mean deviation of distance between events) as well as features based on the distribution of vowel, consonant, and syllable durations (overall percentages, standard deviation, and Pairwise Variability Index). For the third feature "pronunciation", examples include acoustic model likelihood scores, generated during forced alignment with a native speaker acoustic model, the average word-level confidence score of ASR and the average difference between the vowel duration in the utterance and vowel-specific means based on a corpus of native speech. For the fourth feature "grammar", example include similarity scores of the grammar of the response in ASR with respect to reference response. For the fifth feature "vocabulary use", examples include features about how diverse and sophisticated the vocabulary based on the ASR output.

In Table 1, using Pearson correlations between these features and human rated scores computed on the train set, a subset of features (n=12) were firstly selected. Then, SKLL toolkit was used for training and evaluating different scoring models. Different regression methods are executed, including Random Forest (RF), Gradient Boosting Tree (GBT), Support Vector Regression (SVR) for the speech scoring task. These models' hyper parameters were decided automatically by the SKLL using a 5-fold cross validation on the train set. Among the three methods, the GBT model was found to provide the highest machine-human score correlation.

Keras Python package is used to implement all DL based models described in above. Pre-trained Glove word embedding's are used, and the embedding dimension is set to 300. When a word could not be found in the Glove embedding's vocabulary, its embedding vector is set up to be all zeros. For acoustic cues, Kaldi ASR's outputs are used to obtain both AM posterior probabilities and durations, and used Praat software to obtain pitch and intensity measurements. When training DL based models using the Adam optimization, 10% of the train set for using early stopping is randomly selected to avoid over-fitting. For DL hyper-parameter tuning, Tree Parzen Estimation (TPE) method is implemented in this study for hyper-parameter tuning. This approach is implemented using Hyperopt Python package. Keras with Theano backend is run on a Nvidia Titan X GPU card to speed up the entire experiment. After running 100 iterations of hyper-parameter search, the following selection is obtained: $conv_{size}$ is 4 (entailing that the various filter sizes were (3; 4; 5)), $conv_n$ is 100, $dp_{cnn}1$ is 0.25, $dp_{cnn}2$ is 0.5, $LSTM_{dim}^{lex}$ is 128, $LSTM_{dim}^{ac}$ is 32, $dp_{LSTM}1$ is 0.25, and $dp_{LSTM}2$ is 0.5.

Table 2 reports the machine scoring experiment of the present disclosure using both the conventional method and DL based methods explained in section 2.2 and 2.3.

TABLE 2

| System | Pearson r |
|---|---|
| Conventional model | 0.585 |
| CNN | 0.581 |
| BD-LSTM | 0.531 |
| BD-LSTM w/attention | 0.602 |

In Table 2, the Pearson r score for conventional model is 0.585, the score for CNN is 0.581, the score for BD-LSTM is 0.531, and the score for BD-LSTM with attention is 0.602.

The conventional model using sophisticated speech features and the GBT regression model leads to 0.585 Pearson correlation between machine predicted scores and human rated scores. This result was consistent with the results reported on similar tasks previously. The CNN based model of the present disclosure achieved a Pearson correlation of 0.581 which is very close to the conventional model. According to some embodiments, based on the experiments BD-LSTM model also did not show any considerable performance improvement regardless of incorporating richer sequential information compare to the CNN model. According to some embodiments, after applying the simple feed-forward attention mechanism, the predicted scores had the highest Pearson correlation to the human rated ones with 0.602 correlation. This result shows weighting among all internal hidden states plays an important role in increasing prediction accuracy for speech scoring task. According to some embodiments, machine needs to focus on specific part of the speech to evaluate the proficiency instead of taking into account the whole response. This fact also applies to human raters. The experimental results of the present disclosure confirm DL power in extracting meaningful representations for speech scoring task which has superior performance compare to the handcrafted features which were developed during long time of research in both psychology and machine learning fields.

According to some embodiments, deep learning based technology to solve automated speech scoring task in an end-to-end approach is investigated. Different DL models are studied to learn the best predictive features for the speech scoring task. According to some embodiments, CNN model showed a scoring performance quite close to the one demonstrated by a conventional method using handcrafted features and GBT regression model. According to some embodiments, when using an attention mechanism to utilize all hidden states' information, the BD-LSTM model showed dramatic performance improvement compared to both traditional and other DL based models. Experimental results confirm the effectiveness of end-to-end solutions for automated assessment research.

According to some embodiments, it will be important to increase deep learning based models explainability. According to other embodiments, more acoustic cues can be utilized to provide a comprehensive coverage. According to other embodiments, other sophisticated attention mechanisms can be explored to improve the performance.

According to some embodiment, a system for end-to-end automated scoring is disclosed. The system includes a word embedding layer for converting a plurality of ASR outputs into input tensors; a neural network lexical model encoder receiving the input tensors; a neural network acoustic model encoder implementing AM posterior probability, word duration, mean value of pitch and mean value of intensity based on a plurality of cues; and a linear regression module, for receiving concatenated encoded features from the neural network lexical model encoder and the neural network acoustic model encoder.

According to some embodiment, the neural network lexical model encoder and the neural network acoustic model encoder each implements one of a 1D Convolutional Neural Network, a Bi-Directional Recurrent Neural Network (RNN) using Long Short Time Memory (LSTM) cells (BD-LSTM), and BD-LSTM RNN with an attention weighting scheme.

According to some embodiment, the 1D Convolutional Neural Network further includes: a layer for receiving input for ASR outputs using an embedding layer; a dropout layer;

a layer of one dimensional convolution with multiple varied-sized filters; a max overtime pooling layer; and a second dropout layer.

According to some embodiment, the Bi-Directional Recurrent Neural Network using Long Short Time Memory cells further includes: a layer for receiving input for ASR outputs using an embedding layer; a dropout layer; a layer of Bi-Directional Recurrent Neural Network using Long Short Time Memory cells; and a second dropout layer.

According to some embodiment, the Bi-Directional Recurrent Neural Network using Long Short Time Memory cells with an attention weighting scheme further includes: a layer for receiving input for ASR outputs using an embedding layer; a dropout layer; a layer of Bi-Directional Recurrent Neural Network using Long Short Time Memory cells; an attention layer; and a second dropout layer.

According to some embodiment, the Bi-Directional Recurrent Neural Network processes a sequence of input data by recursively applying a transitional function to a hidden state vector $h_t$. According to some embodiment, the activation of $h_t$ at a time-step t depends on both a current input $x_t$ and a previous hidden state $h_{t-1}$ by $h_t = f(h_{t-1}, x_t)$. According to some embodiment, the Bi-Directional Recurrent Neural Network encodes an input sequence to a fixed-sized vector $h_T$ on a last time step T and uses the fixed-sized vector $h_T$ as a input for a following prediction step. According to some embodiment, the LSTM cells are defined by a plurality of vectors, wherein the plurality of vectors further comprises: an input gate $i_t$, a forget gate $f_t$, an output gate $o_t$, a memory cell $c_t$ and a hidden state $h_t$. According to some embodiment, at each time step, the LSTM maintains a hidden vector h and a memory vector c for controlling state updates and outputs. According to some embodiment, the computation at time step t is defined as:

$$i_t = \sigma(W_i x_t + U_i h_{t-1} + V_i c_{t-1})$$

$$f_t = \sigma(W_f x_t + U_f h_{t-1} + V_f c_{t-1})$$

$$o_t = \sigma(W_o x_t + U_o h_{t-1} + V_o c_t)$$

$$c_t = f_t \odot c_{t-1} + i_t \odot \tan h(W_c x_t + U_c h_{t-1})$$

$$h_t = o_t \odot \tan h(c_t)$$

where $x_t$ is an input at the current time step t, $\sigma$ is the logistic sigmoid function.

According to some embodiment, a method for end-to-end automated scoring is disclosed. The method includes the steps of: deploying a word embedding layer for converting a plurality of ASR outputs into input tensors; deploying a neural network lexical model encoder receiving the input tensors; deploying a neural network acoustic model encoder implementing AM posterior probability, word duration, mean value of pitch and mean value of intensity based on a plurality of cues; and deploying a linear regression module, for receiving concatenated encoded features from the neural network lexical model encoder and the neural network acoustic model encoder.

According to some embodiment, the neural network lexical model encoder and the neural network acoustic model encoder is each constructed by implementing one of a 1D Convolutional Neural Network, a Bi-Directional Recurrent Neural Network (RNN) using Long Short Time Memory (LSTM) cells (BD-LSTM), and BD-LSTM RNN with an attention weighting scheme.

According to some embodiment, the 1D Convolutional Neural Network is constructed by: deploying a layer for receiving input for ASR outputs using an embedding layer; deploying a dropout layer; deploying a layer of one dimensional convolution with multiple varied-sized filters; deploying a max overtime pooling layer; and deploying a second dropout layer.

According to some embodiment, the Bi-Directional Recurrent Neural Network using Long Short Time Memory cells is constructed by: deploying a layer for receiving input for ASR outputs using an embedding layer; deploying a dropout layer; deploying a layer of Bi-Directional Recurrent Neural Network using Long Short Time Memory cells; and deploying a second dropout layer.

According to some embodiment, the Bi-Directional Recurrent Neural Network using Long Short Time Memory cells with an attention weighting scheme is constructed by: deploying a layer for receiving input for ASR outputs using an embedding layer; deploying a dropout layer; deploying a layer of Bi-Directional Recurrent Neural Network using Long Short Time Memory cells; deploying an attention layer; and deploying a second dropout layer.

According to some embodiment, the Bi-Directional Recurrent Neural Network processes a sequence of input data by recursively applying a transitional function to a hidden state vector $h_t$. According to some embodiment, the activation of $h_t$ at a time-step t depends on both a current input $x_t$ and a previous hidden state $h_{t-1}$ by $h_t = f(h_{t-1}, x_t)$. According to some embodiment, the Bi-Directional Recurrent Neural Network encodes an input sequence to a fixed-sized vector $h_T$ on a last time step T and uses the fixed-sized vector $h_T$ as a input for a following prediction step. According to some embodiment, the LSTM cells are defined by a plurality of vectors, wherein the plurality of vectors further comprises: an input gate $i_t$, a forget gate $f_t$, an output gate $o_t$, a memory cell $c_t$ and a hidden state $h_t$.

According to some embodiment, a Bi-Directional Recurrent Neural Network system using Long Short Time Memory cells with an attention weighting scheme is disclosed. The system includes: a layer for receiving input for ASR outputs using an embedding layer; a dropout layer for improving over-fit; a layer of Bi-Directional Recurrent Neural Network using Long Short Time Memory cells; an attention layer; and a second dropout layer for improving over-fit.

According to some embodiment, a 1D Convolutional Neural Network system is disclosed. The system includes: a layer for receiving input for ASR outputs using an embedding layer; a dropout layer for improving over-fit; a layer of one dimensional convolution with multiple varied-sized filters; a max overtime pooling layer; and a second dropout layer for improving over-fit.

According to some embodiment, a Bi-Directional Recurrent Neural Network system using Long Short Time Memory cells is disclosed, the system includes: a layer for receiving input for ASR outputs using an embedding layer; a dropout layer for improving over-fit; a layer of Bi-Directional Recurrent Neural Network using Long Short Time Memory cells; and a second dropout layer for improving over-fit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for end-to-end automated scoring, the system comprising: a word embedding layer for converting a plurality of automatic speech recognition (ASR) outputs into input tensors; a neural network lexical model encoder receiving the input tensors; a neural network acoustic model (AM) encoder implementing AM posterior probability, word duration, mean value of pitch and mean value of intensity based on a plurality of cues; and a linear regression module, for receiving concatenated encoded features from the neural network lexical model encoder and the neural network acoustic model encoder.

2. The system of claim 1, wherein the neural network lexical model encoder and the neural network acoustic model encoder each implements one of a 1D Convolutional Neural Network, a Bi-Directional Recurrent Neural Network (RNN) using Long Short Time Memory (LSTM) cells (BD-LSTM), and BD-LSTM RNN with an attention weighting scheme.

3. The system of claim 2, wherein the 1D Convolutional Neural Network further comprises:
a layer for receiving input for ASR outputs using an embedding layer;
a dropout layer for improving over-fit;
a layer of one dimensional convolution with multiple varied-sized filters;
a max overtime pooling layer; and
a second dropout layer for improving over-fit.

4. The system of claim 2, wherein the Bi-Directional Recurrent Neural Network using Long Short Time Memory cells further comprises:
a layer for receiving input for ASR outputs using an embedding layer;
a dropout layer for improving over-fit;
a layer of Bi-Directional Recurrent Neural Network using Long Short Time Memory cells; and
a second dropout layer for improving over-fit.

5. The system of claim 2, wherein the Bi-Directional Recurrent Neural Network using Long Short Time Memory cells with an attention weighting scheme further comprises:
a layer for receiving input for ASR outputs using an embedding layer;
a dropout layer for improving over-fit;
a layer of Bi-Directional Recurrent Neural Network using Long Short Time Memory cells;
an attention layer; and
a second dropout layer for improving over-fit.

6. The system of claim 4, wherein the Bi-Directional Recurrent Neural Network processes a sequence of input data by recursively applying a transitional function to a hidden state vector $h_t$.

7. The system of claim 6, wherein the activation of $h_t$ at a time-step t depends on both a current input $x_t$ and a previous hidden state $h_{t-1}$ by $h_t = f(h_{t-1}, x_t)$.

8. The system of claim 7, wherein the Bi-Directional Recurrent Neural Network encodes an input sequence to a fixed-sized vector $h_T$ on a last time step T and uses the fixed-sized vector $h_T$ as a input for a following prediction step.

9. The system of claim 8, wherein the LSTM cells are defined by a plurality of vectors, wherein the plurality of vectors further comprises: an input gate $i_t$, a forget gate $f_t$, an output gate $o_t$, a memory cell $c_t$ and a hidden state $h_t$.

10. The system of claim 9, wherein at each time step, the LSTM maintains a hidden vector h and a memory vector c for controlling state updates and outputs.

11. The system of claim 10, wherein the computation at time step t is defined as:

$$i_t = \sigma(W_i x_t + U_i h_{t-1} + V_i c_{t-1})$$

$$f_t = \sigma(W_f x_t + U_f h_{t-1} + V_f c_{t-1})$$

$$o_t = \sigma(W_o x_t + U_o h_{t-1} + V_o c_t)$$

$$c_t = f_t \odot c_{t-1} + i_t \odot \tan h(W_c x_t + U_c h_{t-1})$$

$$h_t = o_t \odot \tan h(c_t)$$

wherein $x_t$ is an input at the current time step t, σ is tahe logistic sigmoid function.

12. A method for end-to-end automated scoring, the method comprising the steps of: deploying a word embedding layer for converting a plurality of automatic speech recognition (ASR) outputs into input tensors; deploying a neural network lexical model encoder receiving the input tensors; deploying a neural network acoustic model (AM) encoder implementing AM posterior probability, word duration, mean value of pitch and mean value of intensity based on a plurality of cues; and deploying a linear regression module, for receiving concatenated encoded features from the neural network lexical model encoder and the neural network acoustic model encoder.

13. The method of claim 12, wherein the neural network lexical model encoder and the neural network acoustic model encoder is each constructed by implementing one of a 1D Convolutional Neural Network, a Bi-Directional Recurrent Neural Network (RNN) using Long Short Time Memory (LSTM) cells (BD-LSTM), and BD-LSTM RNN with an attention weighting scheme.

14. The method of claim 13, wherein the 1D Convolutional Neural Network is constructed by:
deploying a layer for receiving input for ASR outputs using an embedding layer;
deploying a dropout layer for improving over-fit;
deploying a layer of one dimensional convolution with multiple varied-sized filters;
deploying a max overtime pooling layer; and
deploying a second dropout layer for improving over-fit.

15. The method of claim 14, wherein the Bi-Directional Recurrent Neural Network using Long Short Time Memory cells is constructed by:
deploying a layer for receiving input for ASR outputs using an embedding layer;
deploying a dropout layer for improving over-fit;
deploying a layer of Bi-Directional Recurrent Neural Network using Long Short Time Memory cells; and
deploying a second dropout layer for improving over-fit.

16. The method of claim 15, wherein the Bi-Directional Recurrent Neural Network using Long Short Time Memory cells with an attention weighting scheme is constructed by:
deploying a layer for receiving input for ASR outputs using an embedding layer;
deploying a dropout layer for improving over-fit;
deploying a layer of Bi-Directional Recurrent Neural Network using Long Short Time Memory cells;
deploying an attention layer; and
deploying a second dropout layer for improving over-fit.

17. The method of claim 16, wherein the Bi-Directional Recurrent Neural Network processes a sequence of input data by recursively applying a transitional function to a hidden state vector $h_t$.

18. The method of claim 17, wherein the activation of $h_t$ at a time-step t depends on both a current input $x_t$ and a previous hidden state $h_{t-1}$ by $h_t = f(h_{t-1}, x_t)$.

19. The method of claim 18, wherein the Bi-Directional Recurrent Neural Network encodes an input sequence to a fixed-sized vector $h_T$ on a last time step T and uses the fixed-sized vector $h_T$ as a input for a following prediction step.

20. The method of claim 19, wherein the LSTM cells are defined by a plurality of vectors, wherein the plurality of vectors further comprises: an input gate $i_t$, a forget gate $f_t$, an output gate $o_t$, a memory cell $c_t$ and a hidden state $h_t$.

* * * * *